US011557054B1

(12) United States Patent
Lu et al.

(10) Patent No.: US 11,557,054 B1
(45) Date of Patent: Jan. 17, 2023

(54) METHOD FOR PERFORMING REGION-OF-INTEREST-BASED DEPTH DETECTION WITH AID OF PATTERN-ADJUSTABLE PROJECTOR, AND ASSOCIATED APPARATUS

(71) Applicant: HIMAX TECHNOLOGIES LIMITED, Tainan (TW)

(72) Inventors: Hsueh-Tsung Lu, Tainan (TW); Ching-Wen Wang, Tainan (TW); Cheng-Che Tsai, Tainan (TW); Wu-Feng Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 70 days.

(21) Appl. No.: 17/356,553

(22) Filed: Jun. 24, 2021

(51) Int. Cl.
*G06K 9/00* (2022.01)
*G06T 7/571* (2017.01)
*G06T 7/536* (2017.01)
*G06V 10/20* (2022.01)

(52) U.S. Cl.
CPC .............. *G06T 7/571* (2017.01); *G06T 7/536* (2017.01); *G06V 10/255* (2022.01)

(58) Field of Classification Search
CPC . G06T 2207/10028; G06T 7/521; G06T 7/50; G06T 2207/30196; G06T 2207/10048; G06T 2210/12; G06V 40/166; G06V 40/173; G06V 40/103; G06V 40/168
See application file for complete search history.

(56) References Cited

U.S. PATENT DOCUMENTS

| | | | | |
|---|---|---|---|---|
| 9,536,312 | B2 * | 1/2017 | Zhang | G06T 7/593 |
| 9,563,955 | B1 * | 2/2017 | Kamarshi | G06T 7/20 |
| 9,759,994 | B1 * | 9/2017 | Soyannwo | A63F 13/213 |
| 10,542,248 | B2 * | 1/2020 | Appia | H04N 13/271 |
| 10,574,938 | B1 * | 2/2020 | Trail | H04N 5/345 |
| 11,146,747 | B1 * | 10/2021 | Zhang | H04N 13/296 |
| 11,195,291 | B1 * | 12/2021 | Li | G06T 7/521 |
| 11,407,117 | B1 * | 8/2022 | Hickman | G06T 7/70 |
| 2015/0022697 | A1 * | 1/2015 | Appia | H04N 9/3173 348/240.99 |

(Continued)

*Primary Examiner* — Shervin K Nakhjavan
(74) *Attorney, Agent, or Firm* — Winston Hsu

(57) ABSTRACT

A method for performing region-of-interest (ROI)-based depth detection with aid of a pattern-adjustable projector and associated apparatus are provided. The method includes: utilizing a first camera to capture a first image, wherein the first image includes image contents indicating one or more objects; utilizing an image processing circuit to determine a ROI of the first image according to the image contents of the first image; utilizing the image processing circuit to perform projection region selection to determine a selected projection region corresponding to the ROI among multiple predetermined projection regions, wherein the selected projection region is selected from the multiple predetermined projection regions according to the ROI; utilizing the pattern-adjustable projector to project a predetermined pattern according to the selected projection region, for performing depth detection; utilizing a second camera to capture a second image; and performing the depth detection according to the second image to generate a depth map.

11 Claims, 10 Drawing Sheets

Start
S11 Utilize first camera to capture first image
S12 Utilize image processing circuit to determine ROI of first image according to image contents of first image
S13 Utilize image processing circuit to perform projection region selection to determine selected projection region corresponding to the ROI among multiple predetermined projection regions
S14 Utilize pattern-adjustable projector to project predetermined pattern according to selected projection region
S15 Utilize second camera to capture second image
S16 Perform depth detection according to second image to generate depth map
S17 Stop?
No
Yes
End

(56) References Cited

U.S. PATENT DOCUMENTS

2017/0150021 A1* 5/2017 Lee ........................ G06V 10/60
2018/0338123 A1* 11/2018 Moule .................. H04N 9/3185
2019/0355138 A1* 11/2019 Hall ................... G02B 27/0172
2022/0239889 A1* 7/2022 Andrews .............. H04N 13/243
2022/0351478 A1* 11/2022 Zhang ..................... G06T 15/20

* cited by examiner

4 Regions

METHOD FOR PERFORMING REGION-OF-INTEREST-BASED DEPTH DETECTION WITH AID OF PATTERN-ADJUSTABLE PROJECTOR, AND ASSOCIATED APPARATUS

BACKGROUND OF THE INVENTION

1. Field of the Invention

The present invention relates to detection mechanism for electronic devices such as mobile devices, and more particularly, to a method for performing region-of-interest (ROI)-based depth detection with aid of a pattern-adjustable projector, and associated apparatus such as a ROI-based depth detection device, an image processing circuit within the ROI-based depth detection device, a depth processor within the image processing circuit, the pattern-adjustable projector within the ROI-based depth detection device, etc.

2. Description of the Prior Art

According to the related art, face recognition technologies have been applied to mobile devices, and some face recognition methods for use of the mobile devices have been proposed. However, some problems may occur. For example, when one or more of the mobile devices cannot perform face recognition correctly, a security issue is introduced. There may be a bottleneck of further improvement of the face recognition algorithms. Hence, there is a need for a novel method and associated architecture to enhance the overall performance of an electronic device without introducing a side effect or in a way that is less likely to introduce a side effect.

SUMMARY OF THE INVENTION

It is therefore an objective of the present invention to provide a method for performing region-of-interest (ROI)-based depth detection with aid of a pattern-adjustable projector, and to provide associated apparatus such as a ROI-based depth detection device, an image processing circuit within the ROI-based depth detection device, a depth processor within the image processing circuit, the pattern-adjustable projector within the ROI-based depth detection device, etc., in order to solve the above-mentioned problems.

At least one embodiment of the present invention provides a method for performing region-of-interest (ROI)-based depth detection with aid of a pattern-adjustable projector, where the method may comprise: utilizing a first camera to capture a first image, wherein the first image comprises image contents indicating one or more objects; utilizing an image processing circuit to determine a ROI of the first image according to the image contents of the first image; utilizing the image processing circuit to perform projection region selection to determine a selected projection region corresponding to the ROI among multiple predetermined projection regions, wherein the selected projection region is selected from the multiple predetermined projection regions according to the ROI; utilizing the pattern-adjustable projector to project a predetermined pattern according to the selected projection region, for performing depth detection; utilizing a second camera to capture a second image, wherein the second image comprises a projection result of the predetermined pattern on a first object among the one or more objects; and performing the depth detection according to the second image to generate a depth map, wherein the depth map indicates a set of depths of the first object.

At least one embodiment of the present invention provides associated apparatus operating according to the method mentioned above. Examples of the apparatus may include, but are not limited to: a ROI-based depth detection device, an electronic product (e.g. an electronic device such as a mobile device) equipped with the ROI-based depth detection device, the image processing circuit within the ROI-based depth detection device, a depth processor within the image processing circuit, the pattern-adjustable projector within the ROI-based depth detection device, etc.

At least one embodiment of the present invention provides an apparatus for performing region-of-interest (ROI)-based depth detection, where the apparatus may comprise an image processing circuit, and further comprise a first camera, a second camera and a pattern-adjustable projector that are coupled to the image processing circuit. For example, the first camera can be arranged to capture a first image, wherein the first image comprises image contents indicating one or more objects. The image processing circuit can be arranged to determine a ROI of the first image according to the image contents of the first image, and perform projection region selection to determine a selected projection region corresponding to the ROI among multiple predetermined projection regions, wherein the selected projection region is selected from the multiple predetermined projection regions according to the ROI. In addition, the pattern-adjustable projector can be arranged to project a predetermined pattern according to the selected projection region, for performing depth detection. The second camera can be arranged to capture a second image, wherein the second image comprises a projection result of the predetermined pattern on a first object among the one or more objects. Additionally, the image processing circuit can perform the depth detection according to the second image to generate a depth map, wherein the depth map indicates a set of depths of the first object.

The present invention method and associated apparatus (e.g. the ROI-based depth detection device, the image processing circuit within the ROI-based depth detection device, the depth processor within the image processing circuit, the pattern-adjustable projector within the ROI-based depth detection device, etc.) can guarantee that various electronic products equipped with the ROI-based depth detection device can operate properly in various situations, respectively. In addition, the present invention method and associated apparatus can use the predetermined pattern projected in a small transmitting (Tx) field less than a normal Tx field to increase the total power of the predetermined pattern being projected, and use the projection result of the predetermined pattern that has been projected according to the selected projection region corresponding to the ROI, to perform the depth detection accurately and efficiently. In comparison with the related art, the present invention method and associated apparatus can enhance overall performance without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method for performing ROI-based depth detection with aid of a pattern-adjustable projector, and associated apparatus such as at least one portion (e.g. a portion or all) of a ROI-based depth detection device. The ROI-based depth detection device can operate according to the method to perform depth detection accurately and efficiently, to achieve optimal performance of any electronic product equipped with the ROI-based depth detection device. More particularly, the ROI-based depth detection device can perform the ROI-based depth detection accurately and efficiently to generate one or more depth maps, such as depth maps of human faces, to make the electronic product perform three-dimensional (3D) face recognition according to the one or more depth maps accurately and efficiently. The electronic product can utilize the ROI-based depth detection device to generate at least one depth map corresponding to at least one user of the electronic product, for establishing a 3D face database of the at least one depth map in advance, and can compare a target depth map of a person's face among the one or more depth maps with any depth map of the at least one depth map to determine whether this person is any user of the at least one user. If the target depth map matches the any depth map (e.g. this person is the any user), the electronic product can provide services to this person; otherwise (e.g. this person is not any of the at least one user), the electronic product can prevent this person from using any of the services. Examples of the electronic product may include, but are not limited to: a mobile device such as a multifunctional mobile phone, a tablet, a wearable device, an all-in-one (AIO) computer, and a laptop computer.

Figure 1:
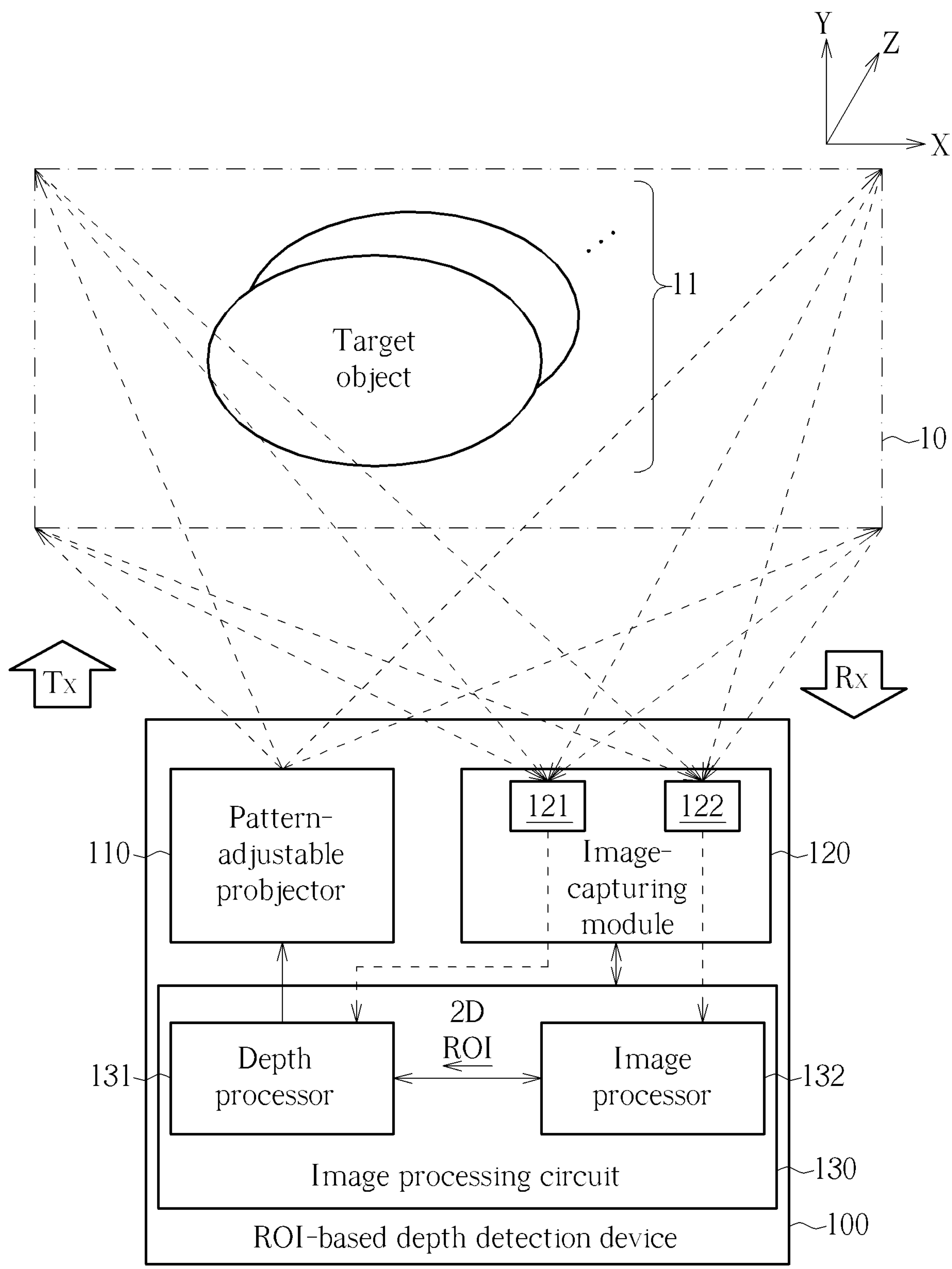
FIG. 1 is a diagram of a ROI-based depth detection device according to an embodiment of the present invention.

FIG. 1 is a diagram of a ROI-based depth detection device 100 according to an embodiment of the present invention, where the ROI-based depth detection device 100 and the pattern-adjustable projector 110 therein can be taken as examples of the ROI-based depth detection device and the pattern-adjustable projector mentioned above, respectively. For better comprehension, a field 10 and one or more target objects 11 may be illustrated with reference to the X-axis, the Y-axis and the Z-axis on the upper half of FIG. 1, but the present invention is not limited thereto. For example, the field 10 (e.g. the shape, the associated sizes and/or the associated angles thereof) and the one or more target objects 11 (e.g. the object count, the shapes, the associated sizes and/or the associated locations thereof) may vary.

As shown in FIG. 1, in addition to the pattern-adjustable projector 110, the ROI-based depth detection device 100 may further comprise an image-capturing module 120 and an image processing circuit 130, where the pattern-adjustable projector 110 and the image-capturing module 120 are coupled to the image processing circuit 130. For example, the image-capturing module 120 may comprise at least one camera (e.g. one or more cameras) such as multiple cameras 121 and 122 respectively corresponding to depth-related processing and two-dimensional (2D) image processing, and the image processing circuit 130 may comprise at least one processor (e.g. one or more processors) such as a depth processor 131 and an image processor 132 respectively corresponding to the depth-related processing and the 2D image processing, but the present invention is not limited thereto. In some embodiments, the cameras 121 and 122 may be integrated into the same camera, and/or the depth processor 131 and the image processor 132 may be integrated into the same processor.

The pattern-adjustable projector 110 can be arranged to project one or more predetermined patterns of invisible light (e.g. infrared (IR) or lights of other wavebands). For example, a laser module within the pattern-adjustable projector 110 may comprise a light emitter and some optical components, where the light emitter may comprise a vertical-cavity surface-emitting laser (VCSEL) array, for emitting invisible light, and the optical components may comprise a diffractive optical element (DOE), a micro-lens array, a wafer-level optics (WLO) component, for generating the one or more predetermined patterns. More particularly, the WLO component may comprise at least one wafer-level lens (e.g. one or more wafer-level lenses). In addition, the pattern-adjustable projector 110 may further comprise one or more electrically-controlled optical components such as at least one liquid crystal (LC) lens (e.g. one or more LC lenses, any of which may be positioned within or outside the laser module), for changing (e.g. tilting) one or more projection directions of the one or more predetermined patterns.

For better comprehension, multiple light transmitting (Tx) paths from the pattern-adjustable projector 110 to the field 10 (e.g. invisible light Tx paths of invisible light from the pattern-adjustable projector 110 to the field 10, and visible light Tx paths of strobe or torch emission from a light emitting diode within the ROI-based depth detection device 100 to the field 10) may be collectively expressed with the Tx direction (labeled "Tx" for brevity), and multiple light receiving (Rx) paths from the field 10 to the cameras 121 and 122 (e.g. invisible light Rx paths of invisible light from the one or more target objects 11 to the camera 121, and visible light Rx paths from the one or more target objects 11 and the background thereof in the field 10 to the camera 122) may be collectively expressed with the Rx direction (labeled "Rx" for brevity).

During the depth detection such as the ROI-based depth detection, the ROI-based depth detection device 100 (e.g. the components therein) can perform the following operations:

(1) the camera 122 can capture a first image, where the first image comprises image contents indicating one or more objects (e.g. the one or more target objects 11), and the first image typically does not have depth information, and may represent a two-dimensional (2D) image;

(2) the image processing circuit 130 (e.g. a first partial circuit of the image processing circuit 130, such as the image processor 132) can determine a ROI of the first image (e.g. a region of a human face, such as a region enclosing the face of the person mentioned above on the first image) according to the image contents of the first image, for further processing of the image processing circuit 130 (e.g. a second partial circuit thereof);

(3) the image processing circuit 130 (e.g. the second partial circuit of the image processing circuit 130, such as the depth processor 131) can perform projection region selection to determine a selected projection region corresponding to the ROI among multiple predetermined projection regions of the pattern-adjustable projector 110, where the selected projection region is selected from the multiple predetermined projection regions according to the ROI;

(4) the pattern-adjustable projector 110 can project a predetermined pattern according to the selected projection region, for performing the depth detection;

(5) the camera 121 can capture a second image, where the second image comprises a projection result of the predetermined pattern on a first object (e.g. the human face such as the face of this person) among the one or more objects; and (6) the image processing circuit 130 (e.g. the depth processor 131) can perform the depth detection according to the second image to generate a depth map (e.g. the one or more depth maps such as the target depth map, or the at least one depth map such as the any depth map), where the depth map indicates a set of depths of the first object.

For example, the first partial circuit of the image processing circuit 130, such as the image processor 132, can generate ROI information indicating the ROI, such as 2D ROI information indicating the ROI of the 2D image (labeled "2D ROI" in FIG. 1 for better comprehension). In addition, the second partial circuit of the image processing circuit 130, such as the depth processor 131, can obtain the ROI information indicating the ROI from the first partial circuit such as the image processor 132, and therefore can be notified of the ROI, for performing the projection region selection as mentioned above. Additionally, the ROI-based depth detection device 100 can utilize the image processing circuit 130 (e.g. the depth processor 131) to generate one or more control signals for controlling the pattern-adjustable projector 110, where the one or more control signals may carry selected projection region information indicating the selected projection region, for notifying the pattern-adjustable projector 110 of the selected projection region. Under control of the image processing circuit 130 (e.g. the depth processor 131), a location of the projection result of the predetermined pattern on the second image may correspond to a location of the ROI on the first image. For example, the relative location of the projection result of the predetermined pattern with respect to a reference point (e.g. a certain corner such as the upper left corner) of the second image may be the same as the relative location of the ROI with respect to a corresponding reference point (e.g. a certain corner such as the upper left corner) of the first image.

As the ROI-based depth detection device 100 (e.g. the components therein, such as the pattern-adjustable projector 110, the image processing circuit 130, the depth processor 131, etc.) can operate according to the method, the ROI-based depth detection device 100 can perform the ROI-based depth detection accurately and efficiently to generate the one or more depth maps, such as the depth maps of the human faces, to make the electronic product equipped with the ROI-based depth detection device 100 perform the 3D face recognition according to the one or more depth maps accurately and efficiently. As a result, the overall performance can be enhanced.

According to some embodiments, the image processing circuit 130 (e.g. the depth processor 131) can calculate the set of depths according to the difference between the projection result and the predetermined pattern, where the projection result may indicate the variation of the predetermined pattern due to non-planar surface of the human face. More particularly, the predetermined pattern may comprise a plurality of sub-patterns (e.g. a plurality of invisible-light tiles, etc.), and based on the knowledge of the associated geometric relationships, the image processing circuit 130 (e.g. the depth processor 131) can calculate the set of depths according to the displacements of some sub-patterns (e.g. some invisible-light tiles) among the plurality of sub-patterns (e.g. the plurality of invisible-light tiles, etc.) of the predetermined pattern, since the depth variations in the set of depths may correspond to the displacements.

Regarding the depth calculations of the set of depths as described above, when a baseline between the center of the pattern-adjustable projector 110 (e.g. the location of an optical axis of the optical components on a reference plane on the ROI-based depth detection device 100) and the center of the image-capturing module 120 (e.g. an average of the respective locations of respective optical axes of the cameras 121 and 122 on the reference plane) is much shorter than the distance between the ROI-based depth detection device 100 and the one or more target objects 11 (e.g. the ratio of the length of the baseline to this distance is less than a predetermined ratio), the image processing circuit 130 (e.g. the depth processor 131) can omit the baseline in the depth calculations, where the length of the baseline can be forcibly set as zero, but the present invention is not limited thereto. In a situation where the baseline is considered, the image processing circuit 130 (e.g. the depth processor 131) can use the real value of the length of the baseline in the depth calculations. For example, when both of the baseline and a sub-baseline between the respective centers of the cameras 121 and 122 (e.g. the respective locations of the respective optical axes of the cameras 121 and 122 on the reference plane) are considered, the image processing circuit 130 (e.g. the depth processor 131) can use the real values of the respective lengths of the baseline and the sub-baseline in the depth calculations. For another example, when the baseline is considered but the sub-baseline is not considered, the image processing circuit 130 (e.g. the depth processor 131) can use the real value of the length of the baseline and omit the sub-baseline in the depth calculations, where the length of the sub-baseline can be forcibly set as zero.

According to some embodiments, the predetermined pattern can be implemented by way of structured light technology, etc., but the present invention is not limited thereto.

Figure 2:
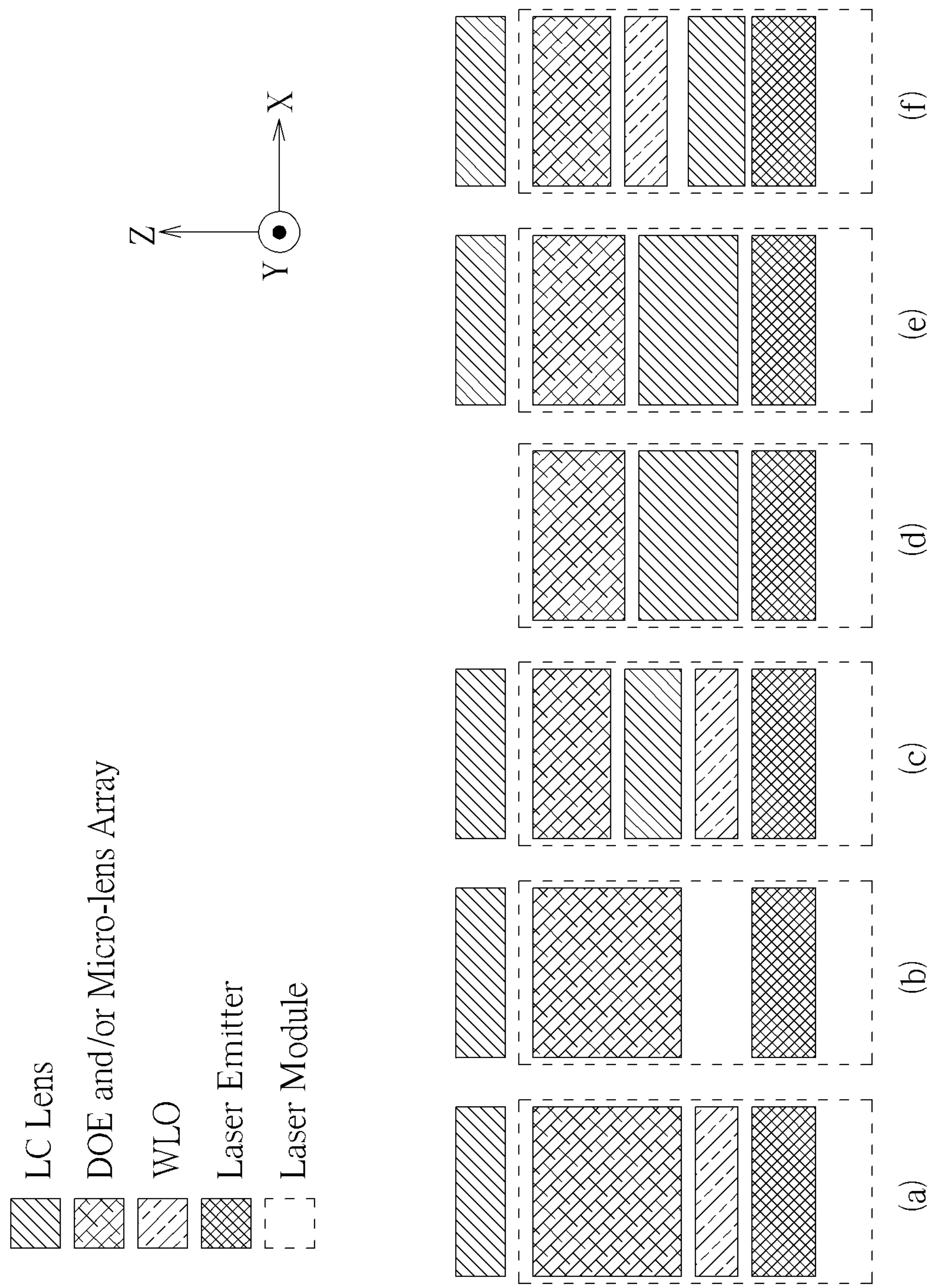
FIG. 2 illustrates some implementation details of the pattern-adjustable projector shown in FIG. 1 according to an embodiment of the present invention.

FIG. 2 illustrates some implementation details of the pattern-adjustable projector 110 shown in FIG. 1 according to an embodiment of the present invention. The pattern-adjustable projector 110 can be implemented by way of various combinations of different sets of components, such as that illustrated in Cases (a), (b), (c), (d), (e) and (f) shown in FIG. 2:

(a) the at least one LC lens comprises a LC lens positioned outside of the laser module, and the WLO component is positioned between the DOE/micro-lens array and the laser emitter;

(b) the at least one LC lens comprises a LC lens positioned outside of the laser module, and no WLO component is used;

(c) in a Type-1 configuration, the at least one LC lens comprises a first LC lens positioned outside of the laser module and a second LC lens positioned within the laser module, the DOE/micro-lens array is positioned between the first LC lens and the second LC lens, and the WLO component is positioned between the second LC lens and the laser emitter;

(d) the at least one LC lens comprises a LC lens positioned within the laser module, between the DOE/micro-lens array and the laser emitter, and no WLO component is used;

(e) the at least one LC lens comprises a first LC lens positioned outside of the laser module and a second LC lens positioned within the laser module, between the DOE/micro-lens array and the laser emitter, and no WLO component is used; and (f) in a Type-2 configuration, the at least one LC lens comprises a first LC lens positioned outside of the laser module and a second LC lens positioned within the laser module, the DOE/micro-lens array is positioned between the first LC lens and the WLO component, and the second LC lens is positioned between the WLO component and the laser emitter;

but the present invention is not limited thereto. For example, as long as similar results can be achieved, some components may be integrated into the same component and/or one or more components may be added, removed, or changed.

According to some embodiments, the laser emitter may comprise at least one invisible-light source (e.g. one or more invisible-light sources), such as the VCSEL array, edge-emitting laser diodes, etc. In addition to the at least one invisible-light source, the laser emitter may further comprise a beam limiting device (e.g. a collimator lens). The beam limiting device can receive the emitted invisible-light from the at least one invisible-light source and convert the emitted invisible-light into beam-limited invisible-light. For brevity, similar descriptions for these embodiments are not repeated in detail here.

Figure 3:
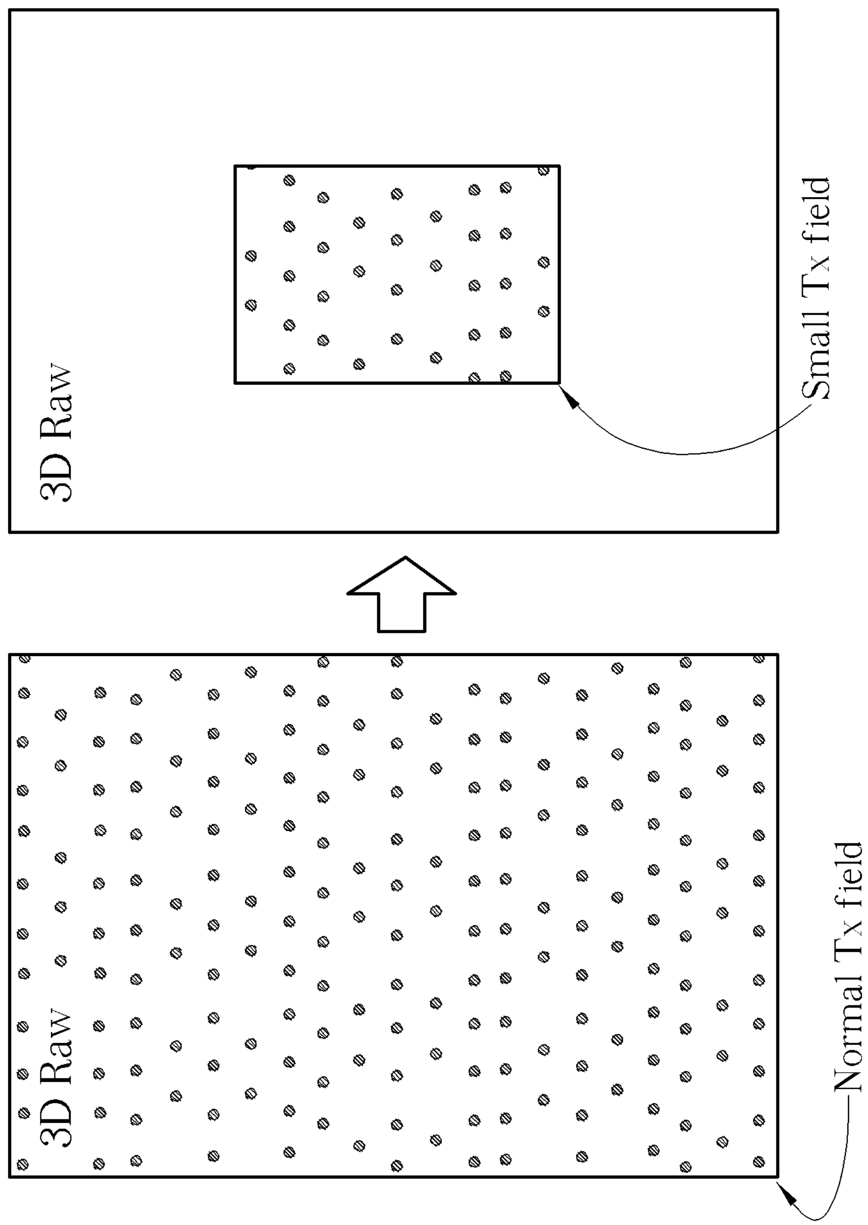
FIG. 3 illustrates, in the right half thereof, a small transmitting (Tx) field control scheme of a method for performing ROI-based depth detection with aid of the pattern-adjustable projector according to an embodiment of the present invention, where a normal Tx field control scheme is also illustrated as shown the left half of FIG. 3 for better comprehension.

FIG. 3 illustrates, in the right half thereof, a small Tx field control scheme of the method for performing ROI-based depth detection with aid of the pattern-adjustable projector according to an embodiment of the present invention, where a normal Tx field control scheme is also illustrated as shown the left half of FIG. 3 for better comprehension. The Rx field (e.g. the field 10 for the Rx direction) can be regarded as the field of view (FOV), and can be referred to as the Rx FOV. In addition, the concept of the Tx field (e.g. the field 10 for the Tx direction) is similar to the concept of the FOV when omitting that the Tx direction is opposite to the Rx direction. In some embodiments, the Tx field (e.g. the field 10 for the Tx direction) can be referred to as the Tx FOV for consistency, but the present invention is not limited thereto.

As shown in the left half of FIG. 3, assume that a non-adjustable projector is capable of projecting its own pattern with a normal Tx field, and when projected, this pattern may distribute over the normal Tx field (e.g. the whole of the field 10, if the non-adjustable projector is arranged to project toward the field 10) in a corresponding 3D raw image (labeled "3D Raw" for brevity). As shown in the right half of FIG. 3, the pattern-adjustable projector 110 can be designed to project the predetermined pattern with a small Tx field (e.g. a Tx field narrower than the normal Tx field), and can utilize the camera 121 to capture a 3D raw image (labeled "3D Raw" for brevity), where the plurality of sub-patterns (e.g. the invisible-light spots) of the predetermined pattern may distribute within the small Tx field (e.g. a portion of the field 10). In addition, the image processing circuit 130 (e.g. the depth processor 131) can control the pattern-adjustable projector 110 to selectively change the projection direction of the predetermined pattern according to the ROI information. For example, the at least one LC lens in the pattern-adjustable projector 110 can be arranged to selectively change the projection direction of the predetermined pattern according to the ROI information.

Figure 4:
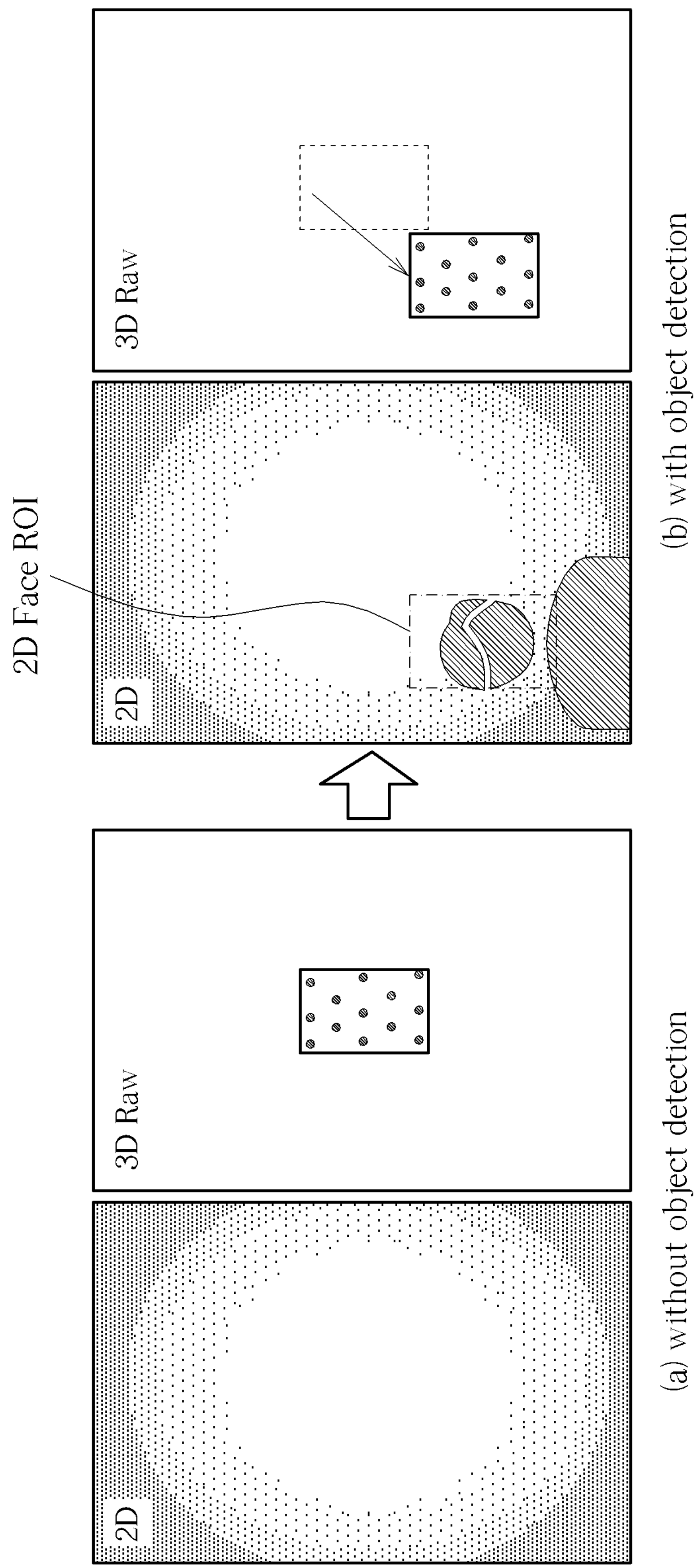
FIG. 4 illustrates a ROI-based projection control scheme of the method according to an embodiment of the present invention.

FIG. 4 illustrates a ROI-based projection control scheme of the method according to an embodiment of the present invention. In Case (a) shown in the left half of FIG. 4, the image processing circuit 130 (e.g. the image processor 132) can utilize the camera 122 to capture a 2D image (labeled "2D" for brevity). Assume that no person appears in the field 10, so the image processing circuit 130 (e.g. the image processor 132) can perform image processing such as dynamic range adjustment, image enhancement, color adjustment, etc., as well as object detection, but does not detect any object since there is merely the background (labeled "without object detection" for brevity). In addition, the image processing circuit 130 (e.g. the depth processor 131) can utilize the pattern-adjustable projector 110 to project the predetermined pattern with the small Tx field and utilize the camera 121 to capture a 3D raw image (labeled "3D Raw" for brevity). As no object is detected, the image processing circuit 130 (e.g. the depth processor 131) can determine the selected projection region as a default projection region (e.g. a central projection region) among the multiple predetermined projection regions. As a result, the plurality of sub-patterns (e.g. the invisible-light spots) of the predetermined pattern may distribute within the default projection region.

In Case (b) shown in the right half of FIG. 4, the image processing circuit 130 (e.g. the image processor 132) can utilize the camera 122 to capture a 2D image (labeled "2D" for brevity). Assume that the person appears in the field 10, so the image processing circuit 130 (e.g. the image processor 132) can perform image processing such as dynamic range adjustment, image enhancement, color adjustment, etc., as well as object detection, and detect the target object such as the face of the person (labeled "with object detection" for brevity) and determine the ROI as a region enclosing the face (labeled "2D Face ROI" for better comprehension). In addition, the image processing circuit 130 (e.g. the depth processor 131) can utilize the pattern-adjustable projector 110 to project the predetermined pattern with the small Tx field according to the ROI and utilize the camera 121 to capture a 3D raw image (labeled "3D Raw" for brevity). As the target object such as the face of the person is detected, the image processing circuit 130 (e.g. the depth processor 131) can determine the selected projection region corresponding to the ROI, where the selected projection region on the second image (the 3D raw image) has been moved from the default location (e.g. the central location of the central projection region) to the location corresponding to the ROI, such as the same relative location as that of the ROI. As a result, the plurality of sub-patterns (e.g. the invisible-light spots) of the predetermined pattern may distribute within the selected projection region corresponding to the ROI.

For better comprehension, assume that the optical output power of the at least one invisible-light source of the pattern-adjustable projector 110 is the same as that of the invisible-light source(s) of the non-adjustable projector. As the total invisible-light power of the predetermined pattern is sent to the small Tx field that is narrower than the normal Tx field, the intensity of the predetermined pattern can be greater than that of the pattern of the non-adjustable projector. In comparison with the non-adjustable projector, the pattern-adjustable projector 110 can generate the predetermined pattern to have higher average brightness in the small Tx field, to enhance at least one signal quality factor (e.g. signal-to-noise ratio (SNR), etc.) of the associated processing in the Rx direction, as well as the image quality of the second image (e.g. the 3D raw image), for enhancing the overall performance. For brevity, similar descriptions for this embodiment are not repeated in detail here.

Figure 5:
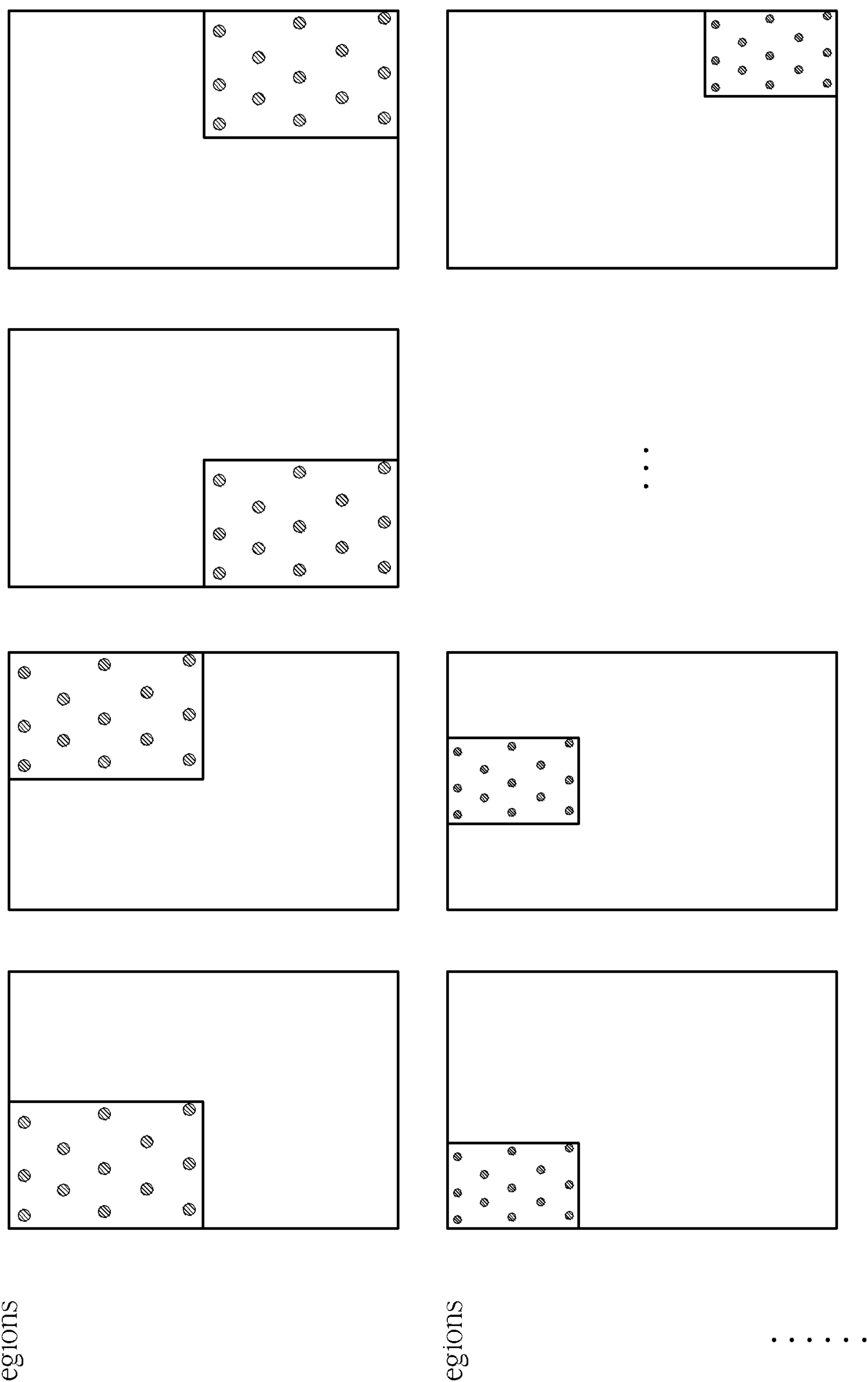
FIG. 5 illustrates some examples of multiple predetermined projection regions used in the method.

FIG. 5 illustrates some examples of the multiple predetermined projection regions used in the method, where these examples correspond to 2D division. In a first case that the region count of the multiple predetermined projection regions is equal to 4 (labeled "4 Regions" for brevity), the depth detection device 100 (e.g. the pattern-adjustable projector 110 and/or the depth processor 131) can control the multiple predetermined projection regions as projection regions (e.g. equal-sized projection regions) corresponding to (2*2) sub-fields of the field 10; in a second case that the region count of the multiple predetermined projection regions is equal to 9 (labeled "9 Regions" for brevity), the depth detection device 100 (e.g. the pattern-adjustable projector 110 and/or the depth processor 131) can control the multiple predetermined projection regions as projection regions (e.g. equal-sized projection regions) corresponding to (3*3) sub-fields of the field 10; and the rest can be deduced by analogy.

Figure 6:
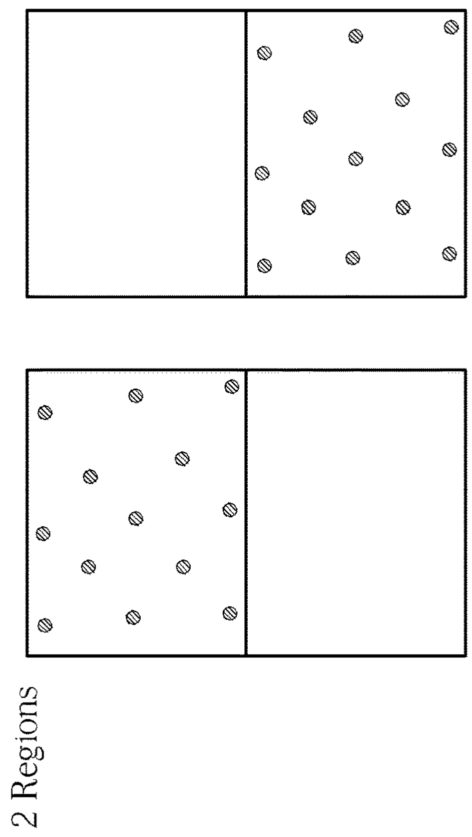
FIG. 6 illustrates some other examples of the multiple predetermined projection regions used in the method.
Figure 6:
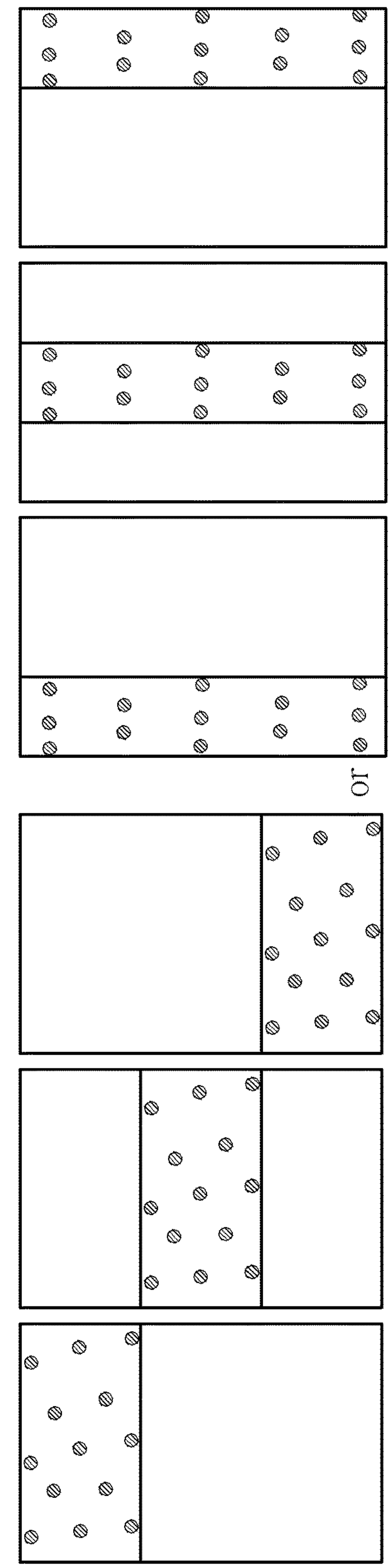

FIG. 6 illustrates some other examples of the multiple predetermined projection regions used in the method, where these examples correspond to one-dimensional (1D) division. In a first case that the region count of the multiple predetermined projection regions is equal to 2 (labeled "2 Regions" for brevity), the depth detection device 100 (e.g. the pattern-adjustable projector 110 and/or the depth processor 131) can control the multiple predetermined projection regions as projection regions (e.g. equal-sized projection regions) corresponding to 2 sub-fields of the field 10; in a second case that the region count of the multiple predetermined projection regions is equal to 3 (labeled "3 Regions" for brevity), the depth detection device 100 (e.g. the pattern-adjustable projector 110 and/or the depth processor 131) can control the multiple predetermined projection regions as projection regions (e.g. equal-sized projection regions) corresponding to 3 sub-fields of the field 10, for example, horizontally divided or vertically divided; and the rest can be deduced by analogy.

Figure 7:
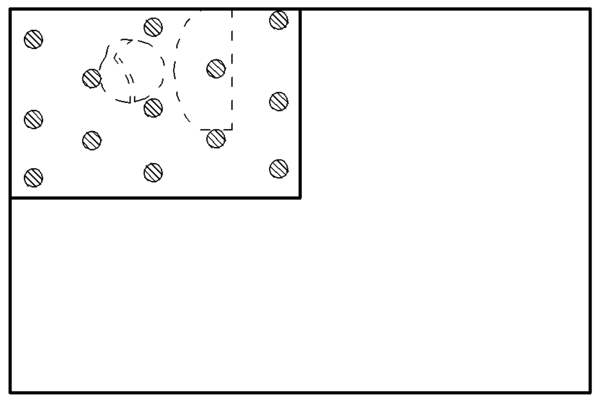
FIG. 7 illustrates some examples of a location of an object with respect to a selected projection region among the multiple predetermined projection regions used in the method.
Figure 7:
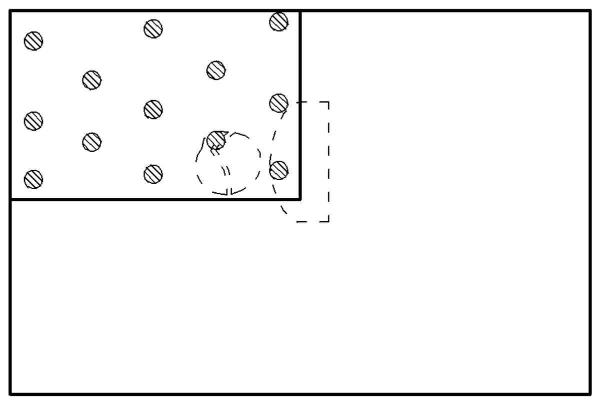
Figure 7:
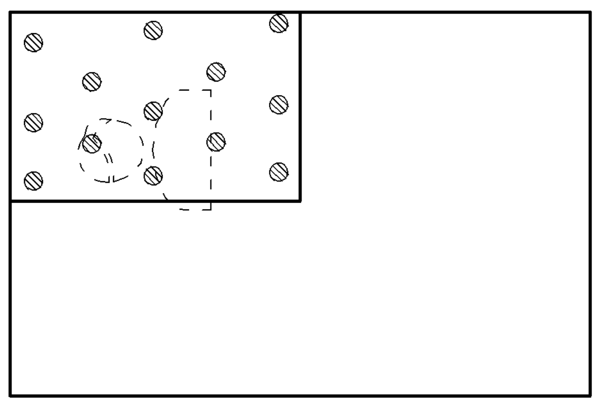

FIG. 7 illustrates some examples of a location of an object (e.g. the target object) with respect to the selected projection region among the multiple predetermined projection regions used in the method. For better comprehension, assume that the selected projection region is positioned on the upper right corner of the field 10 in the first case shown in FIG. 5. The person may appear in any of various places of the same corner. The selected projection region is always valid for all of the associated processing regarding this person.

Figure 8:
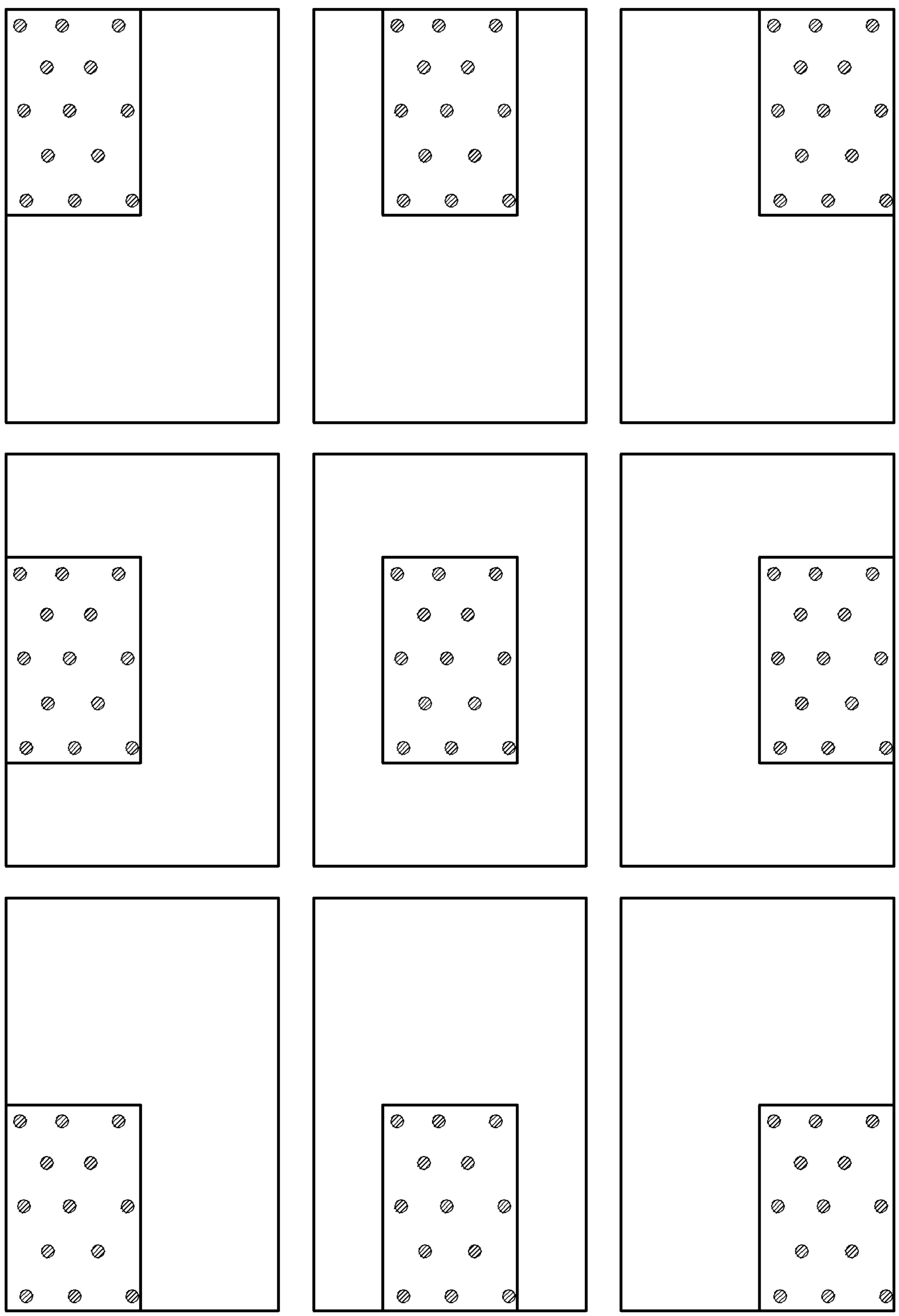
FIG. 8 illustrates some examples of multiple transitional projection regions serving as a portion of the multiple predetermined projection regions used in the method.

FIG. 8 illustrates some examples of multiple transitional projection regions serving as a portion of the multiple predetermined projection regions used in the method. In addition to the examples in the first case shown in FIG. 5, the examples that are added as shown in FIG. 8 indicate the multiple transitional projection regions, and the extend version of the multiple predetermined projection regions as shown in FIG. 8 (e.g. the original four predetermined projection regions in the first case shown in FIG. 5 and these transitional projection regions) can perfectly cover all possible locations of the person within the field 10.

According to some embodiments, multiple reference 3D raw images respectively corresponding to the multiple predetermined projection regions can be generated (e.g. captured) in advance, for use of determining the displacements mentioned above. For example, in a situation where the one or more objects 11 are replaced with a predetermined planar object such as a wall, a screen, etc. in a laboratory, the multiple reference 3D raw images may comprise multiple reference projection results of the predetermined pattern on the predetermined planar object that correspond to the multiple predetermined projection regions, respectively, where a reference 3D raw image corresponding to a certain predetermined projection region among the multiple reference 3D raw images may comprise the projection result corresponding to this predetermined projection region. In addition, the multiple reference 3D raw images can be stored in a non-volatile memory (e.g. a Flash memory) within the image processing circuit 130 in advance. When determining the selected projection region, the depth processor 131 (e.g. a pre-processing module therein) can select a reference 3D raw image corresponding to the selected projection region among the multiple reference 3D raw images. As a result, the depth processor 131 (e.g. a depth decoder therein) can detect the displacements of some sub-patterns (e.g. some invisible-light tiles) among the plurality of sub-patterns (e.g. the plurality of invisible-light tiles, etc.) of the predetermined pattern, and calculate the set of depths according to the displacements of these sub-patterns (e.g. these invisible-light tiles). For brevity, similar descriptions for these embodiments are not repeated in detail here.

Figure 9:
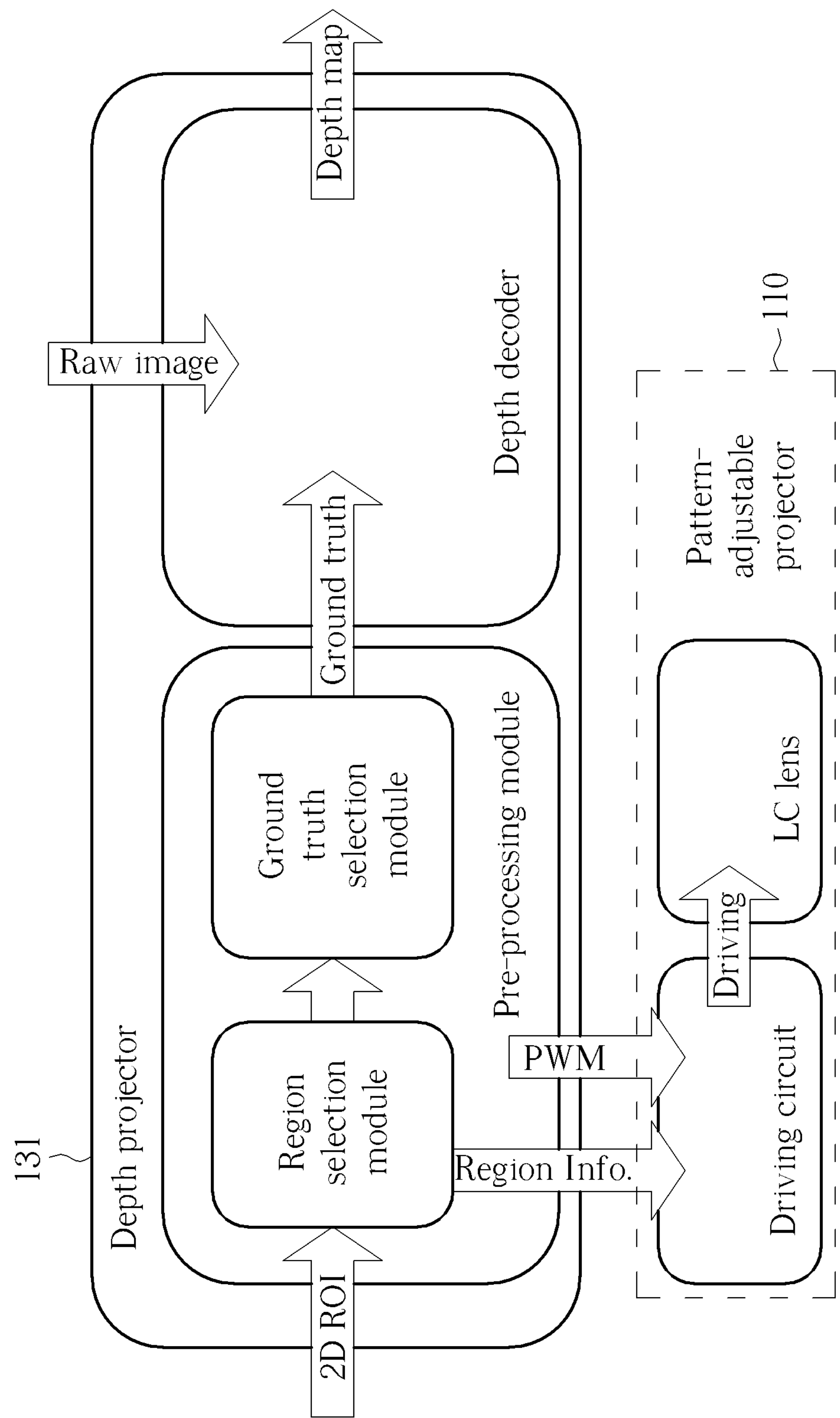
FIG. 9 illustrates some implementation details of the depth processor and the pattern-adjustable projector shown in FIG. 1 according to an embodiment of the present invention.

FIG. 9 illustrates some implementation details of the depth processor 131 and the pattern-adjustable projector 110 shown in FIG. 1 according to an embodiment of the present invention. The pattern-adjustable projector 110 may further comprise one or more driving circuits such as a LC lens driver, for driving the at least one LC lens (labeled "Driving" for brevity). In addition, the depth processor 131 may comprise the pre-processing module and the depth decoder, and the pre-processing module may comprise a region selection module and a ground truth selection module.

The region selection module can obtain the ROI information indicating the ROI, such as the 2D ROI information indicating the ROI of the 2D image (labeled "2D ROI" in FIG. 9 for better comprehension), and perform region selection according to the ROI to determine the selected projection region corresponding to the ROI among multiple predetermined projection regions, and more particularly, generate the one or more control signals for controlling the pattern-adjustable projector 110 (e.g. the one or more driving circuits such as the LC lens driver). As shown in FIG. 9, the one or more control signals may comprise a region information signal carrying the region information of the selected projection region (labeled "Region Info." for brevity), for notifying the pattern-adjustable projector 110 (e.g. the one or more driving circuits such as the LC lens driver) of the selected projection region, and may further comprise a pulse-width modulation (PWM) signal (labeled "PWM" for brevity), for performing some other control. In addition, the ground truth selection module can perform ground truth selection to select a set of ground truth information corresponding to the selected projection region among multiple sets of predetermined ground truth information respectively corresponding to the multiple predetermined projection regions, and output the selected set of ground truth information (labeled "Ground truth" for brevity) to the depth decoder, for use of the depth calculations. Additionally, the depth decoder can obtain the selected set of ground truth information from the ground truth selection module, and obtain the second image such as the 3D raw image (labeled "Raw image" for brevity) from an image buffer within the image processing circuit 130, where the image buffer can buffer (e.g. temporarily store) the second image received from the camera 121. Based on the selected set of ground truth information, the depth decoder can perform depth decoding on the second image (e.g. the projection result of the predetermined pattern on the first object, as recorded on the second image) to generate the depth map. For brevity, similar descriptions for this embodiment are not repeated in detail here.

In the embodiment shown in FIG. 9, the one or more driving circuits can be implemented within the pattern-adjustable projector 110, but the present invention is not limited thereto. In some embodiments, the one or more driving circuits (e.g. the LC lens driver and the laser emitter driver) can be implemented within the image processing circuit 130. For brevity, similar descriptions for these embodiments are not repeated in detail here.

According to some embodiments, the LC lens driver and the laser emitter driver can be integrated into the same driver such as a hybrid driver, and the one or more driving circuits may comprise a single driving circuit such as hybrid driver, but the present invention is not limited thereto. In some embodiments, the one or more driving circuits may comprise multiple driving circuits such as the LC lens driver and the laser emitter driver, where the LC lens driver and the laser emitter driver are different drivers. For brevity, similar descriptions for these embodiments are not repeated in detail here.

According to some embodiments, the depth decoder can perform predetermined mapping based on the selected set of ground truth information, such as ground truth mapping based on the selected set of ground truth information, to convert the displacements of some sub-patterns (e.g. some invisible-light tiles) among the plurality of sub-patterns (e.g. the plurality of invisible-light tiles, etc.) of the predetermined pattern into corresponding depths to complete the depth calculations, but the present invention is not limited thereto. In addition, the multiple sets of predetermined ground truth information may comprise multiple sets of depth-calculation-related parameters respectively corresponding to the multiple predetermined projection regions, for use of performing predetermined mapping based on the multiple sets of predetermined ground truth information, respectively, where the multiple sets of depth-calculation-related parameters can be generated according to the knowledge of the associated geometric relationships in advance, but the present invention is not limited thereto. For brevity, similar descriptions for these embodiments are not repeated in detail here.

According to some embodiments, in a projection control procedure, the depth processor 131 can control the pattern-adjustable projector 110 (e.g. the one or more driving circuits such as the LC lens driver) to drive a certain LC lens (e.g. any LC lens among the at least one LC lens) with signals corresponding to different polarities (e.g. a positive polarity and a negative polarity) alternately, to prevent a certain issue related to the LC lens. In addition, as the LC lens may have uncertain optical characteristics during transitions between the polarities (e.g. the transition from the positive polarity to the negative polarity, or the transition from the negative polarity to the positive polarity), the depth processor 131 can control the pattern-adjustable projector 110 (e.g. the one or more driving circuits such as a laser emitter driver) to drive the laser emitter (e.g. the at least one invisible-light source therein, such as the VCSEL array, the edge-emitting laser diodes, etc.) during a steady state period between two adjacent transitions, to turn on the laser emitter (e.g. the at least one invisible-light source therein) during the steady state period, and more particularly, turn on the laser emitter (e.g. the at least one invisible-light source therein) after entering the steady state period and turn off the laser emitter (e.g. the at least one invisible-light source therein) before leaving the steady state period. For brevity, similar descriptions for these embodiments are not repeated in detail here.

Figure 10:
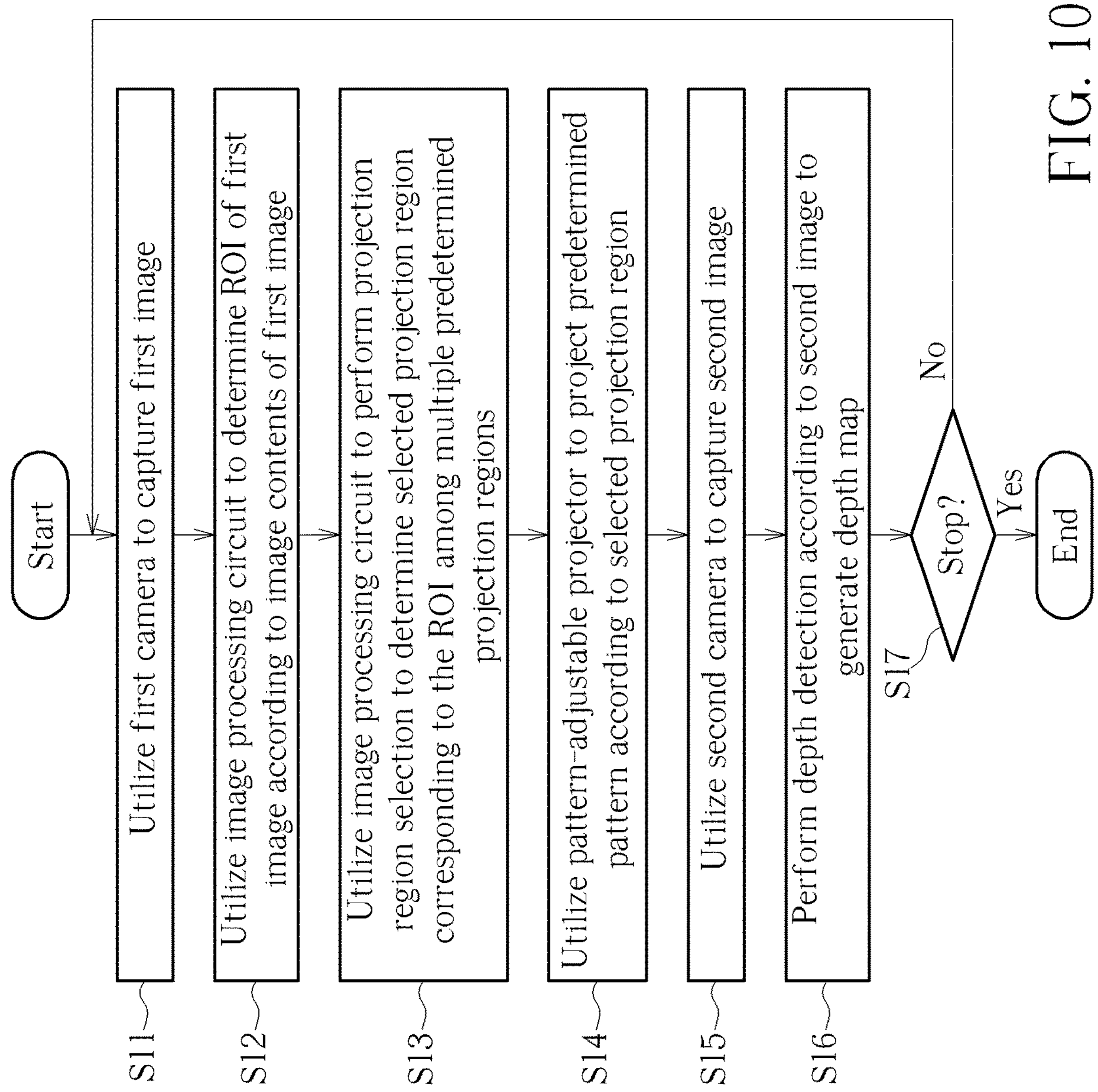
FIG. 10 illustrates a working flow of the method according to an embodiment of the present invention.

FIG. 10 illustrates a working flow of the method according to an embodiment of the present invention. The method may be applied to the associated apparatus (e.g. the ROI-based depth detection device 100, the image processing circuit 130, the depth processor 131, the pattern-adjustable projector 110, etc.), and may be executed by the apparatus.

In Step S11, the depth detection device 100 can utilize a first camera such as the camera 122 to capture the first image, where the first image comprises the image contents indicating the one or more objects such as the one or more target objects 11.

In Step S12, the depth detection device 100 can utilize the image processing circuit 130 (e.g. the first partial circuit of the image processing circuit 130, such as the image processor 132) to determine the ROI of the first image (e.g. the region of the human face) according to the image contents of the first image, for further processing of the image processing circuit 130 (e.g. the second partial circuit thereof). For better comprehension, the ROI may represent the region where the human face is detected on the first image.

In Step S13, the depth detection device 100 can utilize the image processing circuit 130 (e.g. the second partial circuit of the image processing circuit 130, such as the depth processor 131) to perform the projection region selection to determine the selected projection region corresponding to the ROI among the multiple predetermined projection regions, where the selected projection region is selected from the multiple predetermined projection regions according to the ROI.

In Step S14, the depth detection device 100 can utilize the pattern-adjustable projector 110 to project the predetermined pattern according to the selected projection region, for performing the depth detection.

In Step S15, the depth detection device 100 can utilize a second camera such as the camera 121 to capture the second image, where the second image comprises the projection result of the predetermined pattern on the first object (e.g. the human face) among the one or more objects.

In Step S16, the depth detection device 100 can utilize the image processing circuit 130 (e.g. the depth processor 131) to perform the depth detection according to the second image to generate the depth map (e.g. the one or more depth maps such as the target depth map, or the at least one depth map such as the any depth map), where the depth map indicates the set of depths of the first object.

In Step S17, the depth detection device 100 (e.g. the image processing circuit 130) can determine whether to stop the working flow. If Yes, the working flow comes to the end; if No, Step S11 is entered.

For example, in addition to the depth detection device 100, the electronic product may further comprise a processing circuit for controlling operations of the electronic product, and the processing circuit may comprise at least one application processor (e.g. one or more application processors) for running various program codes such as an operating system (OS), drivers, application programs, etc. Under control of a 3D face recognition application (App) running on the at least one application processor, the processing circuit may send one or more commands to the depth detection device 100 for controlling the depth detection device 100. In response to a start command among the one or more commands, the depth detection device 100 (e.g. the image processing circuit 130) can start operating according to this working flow, for returning the depth map mentioned in Step S16 to the processing circuit (e.g. the 3D face recognition App running on the at least one application processor). In Step S17, the depth detection device 100 (e.g. the image processing circuit 130) can check whether a stop command among the one or more commands is received. When the stop command has been received from the processing circuit, the depth detection device 100 (e.g. the image processing circuit 130) can determine the checking result of Step S17 to be Yes. When no stop command has been received from the processing circuit, the depth detection device 100 (e.g. the image processing circuit 130) can determine the checking result of Step S17 to be No. For brevity, similar descriptions for this embodiment are not repeated in detail here.

For better comprehension, the method may be illustrated with the working flow shown in FIG. 10, but the present invention is not limited thereto. According to some embodiments, one or more steps may be added, deleted, or changed in the working flow shown in FIG. 10.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing region-of-interest (ROI)-based depth detection with aid of a pattern-adjustable projector, the method comprising:

utilizing a first camera to capture a first image, wherein the first image comprises image contents indicating one or more objects;

utilizing an image processing circuit to determine a ROI of the first image according to the image contents of the first image;

utilizing the image processing circuit to perform projection region selection to determine a selected projection region corresponding to the ROI among multiple predetermined projection regions, wherein the selected projection region is selected from the multiple predetermined projection regions according to the ROI;

utilizing the pattern-adjustable projector to project a predetermined pattern according to the selected projection region, for performing depth detection;

utilizing a second camera to capture a second image, wherein the second image comprises a projection result of the predetermined pattern on a first object among the one or more objects; and performing the depth detection according to the second image to generate a depth map, wherein the depth map indicates a set of depths of the first object.

2. The method of claim 1, wherein the first image does not have depth information.

3. The method of claim 1, wherein the first image represents a two-dimensional image.

4. The method of claim 1, wherein utilizing the image processing circuit to determine the ROI of the first image according to the image contents of the first image further comprises:

utilizing a first partial circuit of the image processing circuit to determine the ROI of the first image according to the image contents of the first image, for further processing of a second partial circuit of the image processing circuit.

5. The method of claim 4, wherein the first partial circuit of the image processing circuit generates ROI information indicating the ROI; and utilizing the image processing circuit to perform the projection region selection to determine the selected projection region corresponding to the ROI among the multiple predetermined projection regions further comprises:

utilizing the second partial circuit of the image processing circuit to obtain the ROI information indicating the ROI from the first partial circuit, and to perform the projection region selection to determine the selected projection region corresponding to the ROI among the multiple predetermined projection regions.

6. The method of claim 1, further comprising:

utilizing the image processing circuit to generate one or more control signals for controlling the pattern-adjustable projector, wherein the one or more control signals carry selected projection region information indicating the selected projection region, for notifying the pattern-adjustable projector of the selected projection region.

7. The method of claim 1, wherein a location of the projection result of the predetermined pattern on the second image corresponds to a location of the ROI on the first image.

8. The pattern-adjustable projector that operates according to the method of claim 1.

9. The image processing circuit that operates according to the method of claim 1.

10. A depth processor that operates according to the method of claim 1, wherein a first partial circuit of the image processing circuit determines the ROI according to the image contents of the first image, and the depth processor is a second partial circuit of the image processing circuit and performs the projection region selection to determine the selected projection region corresponding to the ROI among the multiple predetermined projection regions.

11. An apparatus for performing region-of-interest (ROI)-based depth detection, the apparatus comprising:

a first camera, arranged to capture a first image, wherein the first image comprises image contents indicating one or more objects;

an image processing circuit, coupled to the first camera, arranged to determine a ROI of the first image according to the image contents of the first image, and perform projection region selection to determine a selected projection region corresponding to the ROI among multiple predetermined projection regions, wherein the selected projection region is selected from the multiple predetermined projection regions according to the ROI;

a pattern-adjustable projector, coupled to the image processing circuit, arranged to project a predetermined pattern according to the selected projection region, for performing depth detection; and a second camera, coupled to the image processing circuit, arranged to capture a second image, wherein the second image comprises a projection result of the predetermined pattern on a first object among the one or more objects;

wherein the image processing circuit performs the depth detection according to the second image to generate a depth map, wherein the depth map indicates a set of depths of the first object.

* * * * *